United States Patent Office 3,562,157
Patented Feb. 9, 1971

3,562,157
INHIBITING BACTERIAL GROWTH WITH MALEALDEHYDE
Merwin Frederick Hoover, Bethel Park, Pa., assignor to Calgon Corporation, Pittsburgh, Pa.
No Drawing. Filed Sept. 20, 1967, Ser. No. 669,258
Int. Cl. C09k 3/00
U.S. Cl. 252—8.55     2 Claims

ABSTRACT OF THE DISCLOSURE

The use of malealdehyde as a bacteriostatic and bactericidal agent is disclosed.

BACKGROUND OF THE INVENTION

Acrolein has long been known to be a powerful bactericide. See, for example, U.S. Pat. 2,987,475. It is believed that the alpha,beta-unsaturated carbonyl system is responsible for the toxic nature of acrolein. See Stack, V. T., Jr., "Toxicity of Alpha, Beta-unsaturated Carbonyl Compounds to Microorganisms," Ind. & Eng. Chem., vol. 49, No. 5, 913–917 (May 1957). However, acrolein has not achieved widespread use as a bactericidal agent because its severe lachrymatory properties and its tendency to polymerize spontaneously.

U.S. Pat. 2,801,216 discloses the use of certain saturated dialdehydes as biocides particularly suited for sulfate-reducing bacteria.

SUMMARY OF THE INVENTION

I have discovered that malealdehyde exhibits excellent bactericidal properties while exhibiting none of the undesirable effects associated with acrolein.

Malealdehyde,

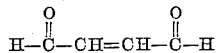

may be prepared by hydrolyzing a 2,5-dialkoxy furan. See U.S. Pat. 2,515,304, British Pat. 603,422, and British Pat. 747,281.

Tables I–VII show the results of tests of the bactericidal activity of malealdehyde prepared by the method of U.S. Pat. 2,515,304. It is possible that the reaction product contains some fumaraldehyde, but for practical purposes, the inhibitor may be considered to be malealdehyde. The pH was adjusted with NaOH, and in some cases, where noted in the tables, a small amount of hydroquinone was added to inhibit polymerization. The test consists of inoculating a culture of *Aerobacter aerogenes* into sterile water, adding known concentrations of the test chemicals and allowing the two to remain in contact for various time intervals. Bacterial counts are run after the stated contact times. The effectiveness of the chemicals is determined by comparing the counts to a control count taken at 0 hours and computing the percent kill.

TABLE I
[Tested immediately after preparation]

| Malealdehyde preparation | Composition | P.p.m. | Percent kill 3 hrs. | 24 hrs. |
|---|---|---|---|---|
| A | Malealdehyde (pH 7.0) | 10 | 99 | 99 |
|   |   | 20 | 91 | 100 |
| B | Malealdehyde (pH 4.0) | 10 | 54 | 100 |
|   |   | 20 | 48 | 100 |
| C | Malealdehyde (pH 7.0 with hydroquinone) | 10 | 44 | 100 |
|   |   | 20 | 99 | 100 |
| D | Malealdehyde (pH 4.0 with hydroquinone) | 10 | 18 | 100 |
|   |   | 20 | 20 | 100 |

TABLE II
[Tested one week after preparation. Same preparations as in Table I]

| Malealdehyde preparation | Composition | P.p.m. | Percent kill 3 hrs. | 24 hrs. |
|---|---|---|---|---|
| A | Malealdehyde (pH 7.0) | 10 | 50 | 100 |
|   |   | 20 | 99 | 100 |
| B | Malealdehyde (pH 4.0) | 10 | 58 | 100 |
|   |   | 20 | 98 | 100 |
| C | Malealdehyde (pH 7.0 with hydroquinone) | 10 | 66 | 100 |
|   |   | 20 | 98 | 100 |
| D | Malealdehyde (pH 4.0 with hydroquinone) | 10 | 57 | 100 |
|   |   | 20 | 98 | 100 |

TABLE III
[Tested three weeks after preparation. Same as preparation in Table I]

| Malealdehyde preparation | Composition | P.p.m. | Percent kill, 24 hrs. |
|---|---|---|---|
| A | Malealdehyde (pH 7.0) | 5 | 60 |
|   |   | 10 | 100 |
|   |   | 20 | 100 |
| C | Malealdehyde (pH 7.0 with hydroquinone) | 5 | 60 |
|   |   | 10 | 100 |
|   |   | 20 | 100 |

TABLE IV
[Tested one month after preparation. Same preparation as in Table I]

| Malealdehyde preparation | Composition | P.p.m. | Percent kill 3 hrs. | 24 hrs. |
|---|---|---|---|---|
| C | Malealdehyde (pH 7.0 with hydroquinone) | 10 | 26 | 47 |

TABLE V
[Tested immediately after preparation]

| Malealdehyde preparation | Composition | P.p.m. | Percent kill 3 hrs. | 24 hrs. |
|---|---|---|---|---|
| E | Malealdehyde | 1 | 0 | 0 |
|   |   | 5 | 6 | 0 |
|   |   | 10 | 6 | 94 |
| F | do | 1 | 0 | 0 |
|   |   | 5 | 15 | 0 |
|   |   | 10 | 17 | 93 |

TABLE VI
[Tested two days after preparation. Same preparations as in Table V]

| Malealdehyde preparation | Composition | P.p.m. | Percent kill 3 hrs. | 24 hrs. |
|---|---|---|---|---|
| E | Malealdhyde | 10 | 41 | 86 |
| F | do | 10 | 33 | 71 |

TABLE VII
[Tested seven days after preparation. Same preparations as in Table V]

| Malealdehyde preparation | Composition | P.p.m. | Percent kill 3 hrs. | 24 hrs. |
|---|---|---|---|---|
| E | Malealdehyde | 1 | 27 | 0 |
|   |   | 10 | 54 | 96 |
|   |   | 20 | 54 | 100 |
| F | do | 1 | 9 | 0 |
|   |   | 10 | 82 | 100 |
|   |   | 20 | 54 | 100 |
| G | do | 1 | 9 | 36 |
|   |   | 10 | 36 | 18 |
|   |   | 20 | 9 | 9 |

Table VIII shows the results of a slightly different test. The test consists of inoculating a culture of *Aerobacter aerogenes* into sterile water, and then adding known concentrations of the composition and allowing them to remain in contact for various time intervals. Bacterial counts are run on the test chemicals after the stated contact time (3 hours and 24 hours). The effectiveness of the composition is determined by comparing the counts to a control count taken at 0 hours.

TABLE VIII

| Malealdehyde preparation | Composition | P.p.m. | Hours | Bacterial count | Percent kill |
|---|---|---|---|---|---|
| A | Malealdehyde (pH 7.0) | 10 | 3 | 2,000 | 99 |
|   |   |   | 24 | 1,000 | 99 |
|   |   | 20 | 3 | 10,000 | 91 |
|   |   |   | 24 | 0 | 100 |
| B | Malealdehyde (pH 4.0) | 10 | 3 | 330,000 | 54 |
|   |   |   | 24 | 0 | 100 |
|   |   | 20 | 3 | 260,000 | 48 |
|   |   |   | 24 | 0 | 100 |
| C | Malealdehyde (pH 7.0 with hydroquinone) | 10 | 3 | 280,000 | 44 |
|   |   |   | 24 | 0 | 100 |
|   |   | 20 | 3 | 3,000 | 99 |
|   |   |   | 24 | 0 | 100 |
| D | Malealdehyde (pH 4.0 with hydroquinone) | 10 | 3 | 410,000 | 18 |
|   |   |   | 24 | 0 | 100 |
|   |   | 20 | 3 | 400,000 | 20 |
|   |   |   | 24 | 0 | 100 |
|   | Acrolein | 10 | 3 | 520,000 | 0 |
|   |   |   | 24 | 304,000 | 75 |

NOTE.—Control counts: 0 hours=600,000; 3 hours=500,000; 24 hours=1,210,000.

My invention may be used in secondary oil recovery to inhibit the growth of anaerobic bacteria in water used for flooding and other purposes, particularly to inhibit sulfate reducers such as *Desulfovibrio desulfuricans*. For this purpose, from 0.1 to 200 p.p.m. is satisfactory to superior, depending on the seriousness of the problem.

To test the effectiveness of malealdehyde as a growth inhibitor for sulfate reducers in their native environment, a sample of produced water was taken from an oil well known to have a sulfate-reducer problem. To this was added various amounts of malealdehyde as shown in Table IX. The samples were allowed to stand for two hours and 1 ml. aliquots removed for injection into a standard sulfate-reducer agar medium. The medium was allowed to solidify, and the cultures retained for 17 days at ambient temperatures. The number of colonies per milliliter was then counted, with the results presented in Table IX.

TABLE IX

| P.p.m. malealdehyde in water sample | Sulphate reducers (colonies/milliliter) | Percent kill |
|---|---|---|
| 0 | 150 |  |
| 10 | 10 | 93 |
| 20 | 10 | 93 |
| 30 | 0 | 100 |
| 40 | 0 | 100 |
| 50 | 0 | 100 |
| 62.5 | 0 | 100 |
| 75 | 0 | 100 |
| 150 | 0 | 100 |

There is no reason to believe that there is a minimum concentration of malealdehyde below which it is completely ineffective as a biocide. However, for practical purposes in uses other than oilfield against sulfate reducers, it should be used in concentrations of at least 1 p.p.m. and preferably 5–15 p.p.m.

I do not intend to be restricted to the above specific examples and illustrations. My invention may be otherwise variously practiced and embodied within the scope of the following claims.

I claim:
1. Method of inhibiting growth of sulfate-reducing bacteria in water in an oil-bearing earth formation comprising adding thereto a growth-inhibiting amount of malealdehyde.
2. Method of claim 1 in which the malealdehyde is added in an amount from 0.1 to 200 parts malealdehyde per million parts water.

References Cited

UNITED STATES PATENTS

| 2,801,216 | 7/1957 | Yoder et al. | 252—8.55X |
| 2,822,227 | 4/1959 | Lindberg | 252—8.55 |
| 2,987,475 | 6/1961 | Lagator | 252—8.55 |
| 3,250,667 | 5/1966 | Lagator | 424—333X |

HERBERT B. GUYNN, Primary Examiner

M. HALPERN, Assistant Examiner

U.S. Cl. X.R.

424—333